United States Patent
Allegorico et al.

(10) Patent No.: US 8,676,391 B2
(45) Date of Patent: Mar. 18, 2014

(54) BLOCKED NOZZLE DETECTION AND REMEDIAL METHOD AND SYSTEM

(75) Inventors: Carmine Allegorico, Florence (IT); Carlo Trombi, Florence (IT)

(73) Assignee: Nuovo Pignone S.p.A., Florence (IT)

( * ) Notice: Subject to any disclaimer, the term of this patent is extended or adjusted under 35 U.S.C. 154(b) by 497 days.

(21) Appl. No.: 13/091,525

(22) Filed: Apr. 21, 2011

(65) Prior Publication Data

US 2011/0270447 A1 Nov. 3, 2011

(51) Int. Cl.
G05D 11/00 (2006.01)

(52) U.S. Cl.
USPC .......................................................... 700/287

(58) Field of Classification Search
USPC .................... 700/282, 287, 289, 290, 304
See application file for complete search history.

(56) References Cited

U.S. PATENT DOCUMENTS

| | | | |
|---|---|---|---|
| 3,638,422 A * | 2/1972 | Loft et al. ................... | 60/39.281 |
| 5,184,526 A | 2/1993 | Watanabe | |
| 2004/0103666 A1 | 6/2004 | Jonsson et al. | |
| 2006/0016196 A1 | 1/2006 | Epstein | |
| 2011/0174053 A1* | 7/2011 | Holt ............................ | 73/23.31 |

FOREIGN PATENT DOCUMENTS

| | | |
|---|---|---|
| EP | 0279487 A2 | 8/1988 |
| EP | 1533573 A1 | 5/2005 |
| EP | 1770331 A2 | 4/2007 |
| EP | 2180165 A2 | 4/2010 |
| JP | 51089016 A | 8/1976 |
| JP | 63123737 U | 8/1988 |

OTHER PUBLICATIONS

Italian Search Report dated Dec. 9, 2010 and issued in connection with Italian Patent Application No. CO2010A000023 which was filed on Apr. 30, 2010.
EP Search Report dated Jun. 21, 2011 and issued in connection with the EP Patent Application No. 11163664.3 which was filed on Apr. 26, 2011.

* cited by examiner

*Primary Examiner* — Sean P. Shechtman
*Assistant Examiner* — Chad Rapp
(74) *Attorney, Agent, or Firm* — Global Patent Operation (57) ABSTRACT

System and method for controlling a stuck nozzle system installed between first and second turbines connected in series to a compressor. The method includes determining whether the nozzle system is stuck; instructing the first turbine to increase a minimum speed reference when the nozzle system is stuck; verifying whether the nozzle system continues to be stuck; instructing the compressor to increase an inlet bleed heat (IBH) flow from a current value to a maximum value when the nozzle system is stuck; verifying whether the nozzle system continues to be stuck; and instructing the compressor to increase an inlet guide vanes (IGV) angle from a current value to a maximum value when the nozzle system is stuck.

10 Claims, 7 Drawing Sheets

BLOCKED NOZZLE DETECTION AND REMEDIAL METHOD AND SYSTEM

BACKGROUND OF THE INVENTION

1. Field of the Invention

Embodiments of the subject matter disclosed herein generally relate to methods and systems and, more particularly, to mechanisms and techniques for remedying a blocked nozzle.

2. Description of Related Art

Figure 1:
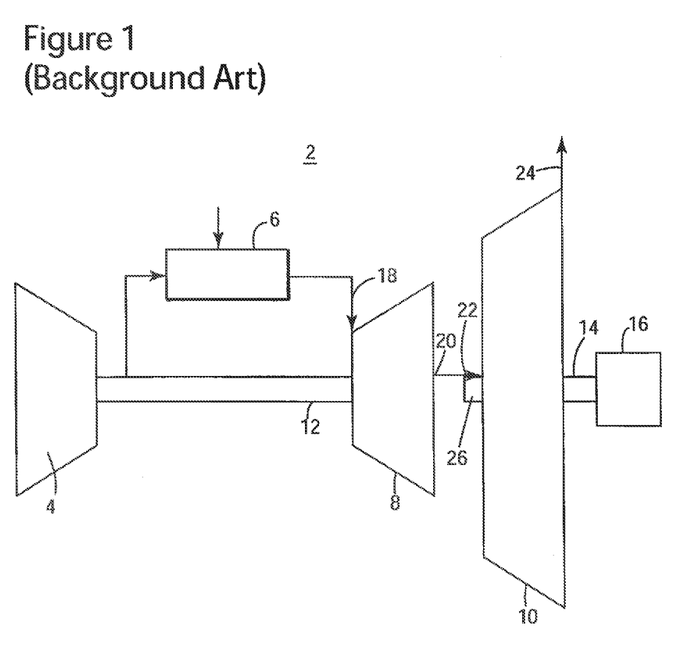
FIG. 1 is a schematic diagram of a conventional gas turbine.

Turbo-machines are used extensively in the oil and gas industry for performing fluid compression, transformation of energy of fluid/gas flow into electrical energy, fluid liquefaction, etc. One such machine is a gas turbine 2 as shown in FIG. 1. Modern gas turbines include a compressor 4, a combustion chamber 6, and plural stages 8 and 10 (e.g., plural expanders in series) that are configured to extract kinetic energy from hot particles provided by the combustion chamber 6, each stage reducing the speed of the particles of the flowing medium.

The two stages of the gas turbine 2 shown in FIG. 1 may include a high-pressure turbine and a low-pressure turbine, respectively. Each stage has its own impeller (not shown) and its own rotor 12 and 14. The first stage 8 has an inlet 18 and an outlet 20. A flowing medium (e.g., exhaust gas from combustor 6) is conventionally introduced at inlet 18. The flowing medium is output at outlet 20 with lower particle speeds. The energy extracted from the flowing medium is transformed by the gas turbine into rotational energy of the rotor 12, which may be transmitted to the compressor 4. It is desired to further extract energy from the exhaust gas at outlet 20 before discharging it into the environment. Thus, the output medium from outlet 20 is provided as input at inlet 22 of the second stage 10. The particle speeds are further reduced in the second stage 10 and outputted at outlet 24. The second stage 10 may be connected to another stage or to a load 16 via shaft 14.

Various gas turbines are using a variable geometry nozzle system 26 between the first stage 8 and the second stage 10. The nozzle system 26 includes a plurality of nozzles that are configured to rotate in order to split an enthalpy between the high-pressure turbine 8 and the low-pressure turbine 10.

However, the nozzle system may malfunction, i.e., one or more of the plurality of nozzles may stick to another part of the nozzle system or the gas turbine, which results in the failure of the other nozzles to rotate and thus, the inability to control the enthalpy split of the input medium.

Accordingly, it would be desirable to provide systems and methods that avoid the afore-described problems and drawbacks.

SUMMARY OF THE INVENTION

According to one exemplary embodiment, there is a method for controlling a stuck nozzle system installed between first and second turbines connected in series to a compressor. The method includes determining whether the nozzle system is stuck; instructing the first turbine to increase a minimum speed reference when the nozzle system is stuck; verifying whether the nozzle system continues to be stuck; instructing the compressor to increase an inlet bleed heat (IBH) flow from a current value to a maximum value when the nozzle system is stuck; verifying whether the nozzle system continues to be stuck; and instructing the compressor to increase an inlet guide vanes (IGV) angle from a current value to a maximum value when the nozzle system is stuck.

According to another exemplary embodiment, there is a system configured to remedy stuck nozzles. The system includes a compressor configured to compress a medium, the compressor including, an inlet bleed heat (IBH) mechanism that allows part of the compressed medium back to an inlet of the compressor, and an inlet guide vanes (IGV) mechanism configured to control a medium flow into the inlet of the compressor. The system also includes a combustor connected to the compressor and configured to mix the compressed medium with fuel for generating an exhaust gas after ignition; first and second turbines connected in series to the combustor; a nozzle mechanism including the nozzles and configured to adjust a split of enthalpy between the first turbine and the second turbine; and a controller connected to the first turbine, the IBH mechanism, and the IGV mechanism and configured to increase a minimum speed reference of the first turbine, an IBH flow and an IGV angle to unstuck the nozzle mechanism.

According to still another exemplary embodiment, there is a computer readable medium including computer executable instructions, where the instructions, when executed, implement a method for controlling a stuck nozzle system installed between first and second turbines connected in series to a compressor. The method is similar to the method discussed above.

According to other exemplary embodiments, the method discussed above may include a step of increasing incrementally the IGV angle from the current value to the maximum value, or detecting whether the nozzle system is still stuck between incremental increases of the IGV angle, or stopping the incremental increase of the IGV angle when the nozzle system is unstuck, or reversing the increased values of the speed of the first turbine, the IBH angle and the IGV angle to the current values when the nozzle system is unstuck.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a two stage gas turbine. However, the embodiments to be discussed next are not limited to these systems, but may be applied to other gas turbines that use nozzle systems to control the gas expansion between high pressure turbines and low pressure turbines.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for detecting when nozzles of a nozzle system do not move and accordingly, the method increases (in a certain range) a minimum speed reference of a first turbine of a gas turbine. If the nozzles are still not responding to commands to open or close, an inlet bleed heating (IBH) flow is increased up to a predetermined value to force the nozzles to move. If the nozzles are still not responding to commands, then an Inlet Guide Vanes (IGV) angle is increased up to a predetermined value. Once the control of the nozzles is regained, the minimum speed reference of the turbine and the IBH and IGV angles are reduced to their initial values.

Figure 2:
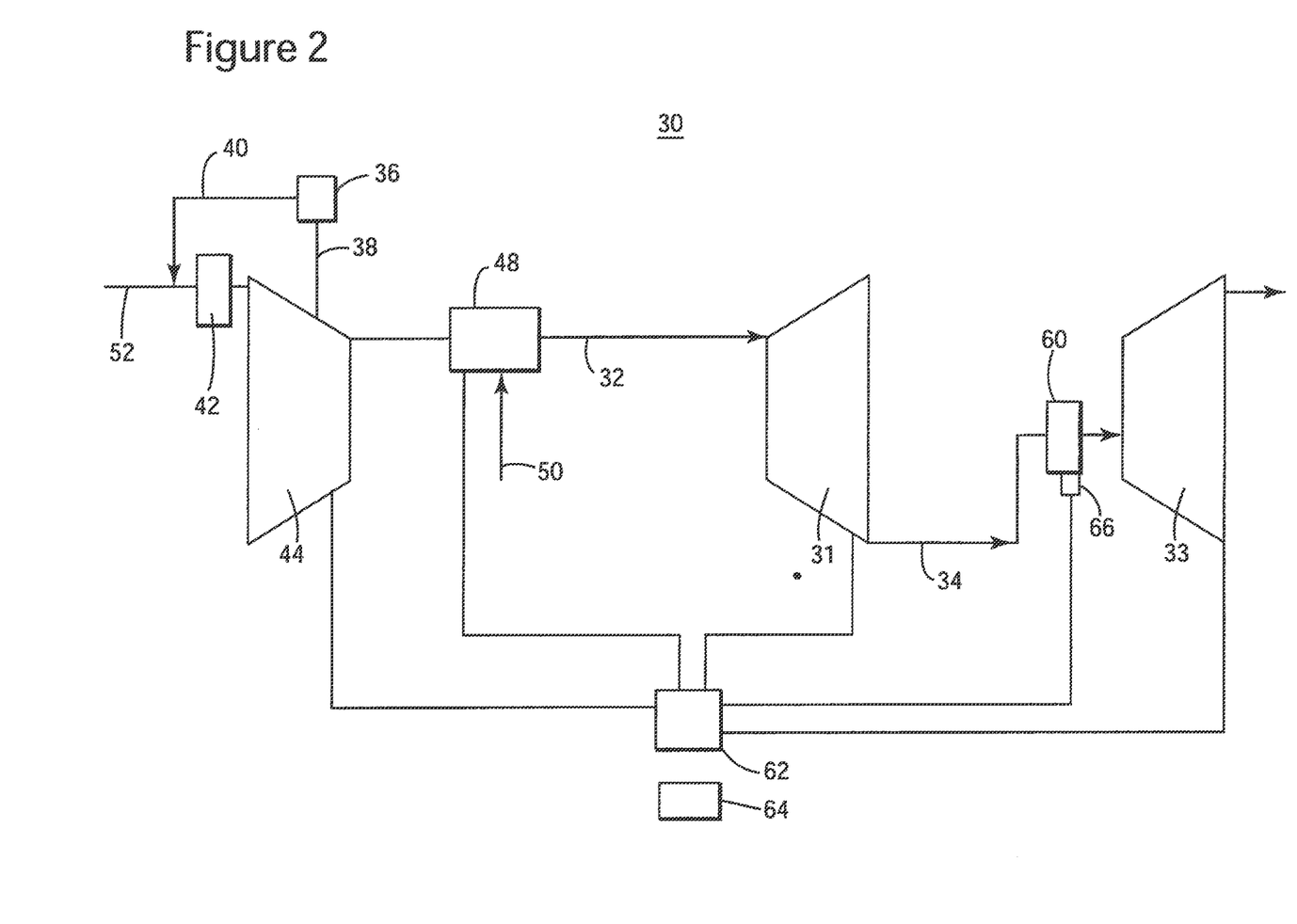
FIG. 2 is a schematic diagram of a gas turbine according to an exemplary embodiment.

According to an exemplary embodiment illustrated in FIG. 2, a gas turbine 30 may include first stage 31 and second stage 32. For simplicity, the discussed gas turbine has two stages. However, the novel features discussed herein apply to a gas turbine having more than two stages. These stages are called sometimes expanders. The first stage 31 has an inlet 32 and an outlet 34. As discussed above, a flowing medium provided at the inlet 32 is expanded and released from the first stage at outlet 34 having a lower energy. Thus, a gas turbine is a rotary engine that extracts energy from a flowing combustion gas. The gas turbine includes, besides the turbines, a compressor and a combustion chamber. FIG. 2 shows the compressor 44 having its output connected to the combustor 48. For example, compressed air from the compressor 44 is mixed in the combustor 48 with fuel provided by a line 50 and ignited. The burnt gas (exhaust gas) has a high temperature and therefore it stores kinetic energy. The hot exhaust gas is provided to the inlet 32 of the first stage 31 (turbine) of the gas turbine 30. An axial compressor, which is the opposite of the gas turbine, may also be used as an example for discussing the exemplary embodiments. However, for simplicity, only the gas turbine is discussed in the exemplary embodiments.

Over time, various mechanisms have been developed to improve the efficiency and the combustor turndown capability of the gas turbine. Such mechanisms include the IBH mechanism, the IGV mechanism, etc. These mechanisms are briefly discussed next.

The IBH mechanism is schematically illustrated in FIG. 2. The IBH mechanism 36 diverts a part of the output medium flowing through compressor 44 along path 38 and reinserts it into an inlet 52 of the compressor 44 along path 40. If the medium is air, the diverted air is called bleed air. One purpose of the IBH mechanism 36 is to increase a temperature of the medium at inlet 52 as the diverted medium flowing along path 38 has a higher temperature that the medium at inlet 52.

Another mechanism used by the gas turbines is the IGV. The IGV mechanism 42 is placed at the inlet 52 of the compressor 44 and is configured to control an amount of medium entering the compressor 44. The IGV 42 includes plural vanes that are configured to rotate in a certain range to increase or decrease an open area of the inlet 52.

Figure 3:
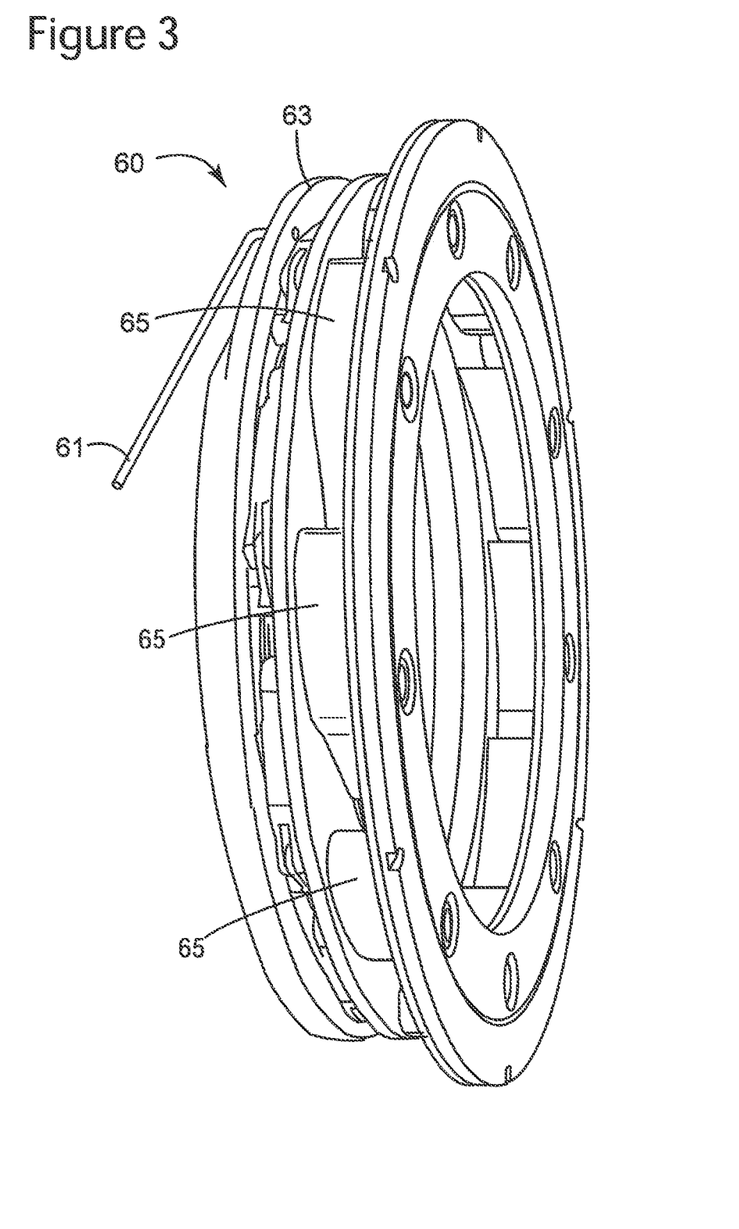
FIG. 3 is a schematic diagram of a nozzle system according to an exemplary embodiment.

FIG. 2 also shows a nozzle mechanism 60 displaced between first turbine 31 and second turbine 32. The nozzle mechanism 60 is configured to control an amount of enthalpy split between the first turbine 31 and the second turbine 32. FIG. 3 shows an example of a nozzle mechanism 60. The nozzle system 60 may include a hydraulic piston 61 connected to a rotating ring 63 that modulates all the nozzles 65 simultaneously through levers to provide a variable area second stage nozzle to the gases coming from the first stage. A logic mechanism 62 may be attached to the gas turbine 30 or may be remotely placed but connected to various elements of the gas turbine 30 to control, for example, the nozzle mechanism 60. The logic 62 may be configured to also control the minimum speed reference to the first turbine 31, various parameters of the compressor 44 and the combustor 48.

Figure 4:
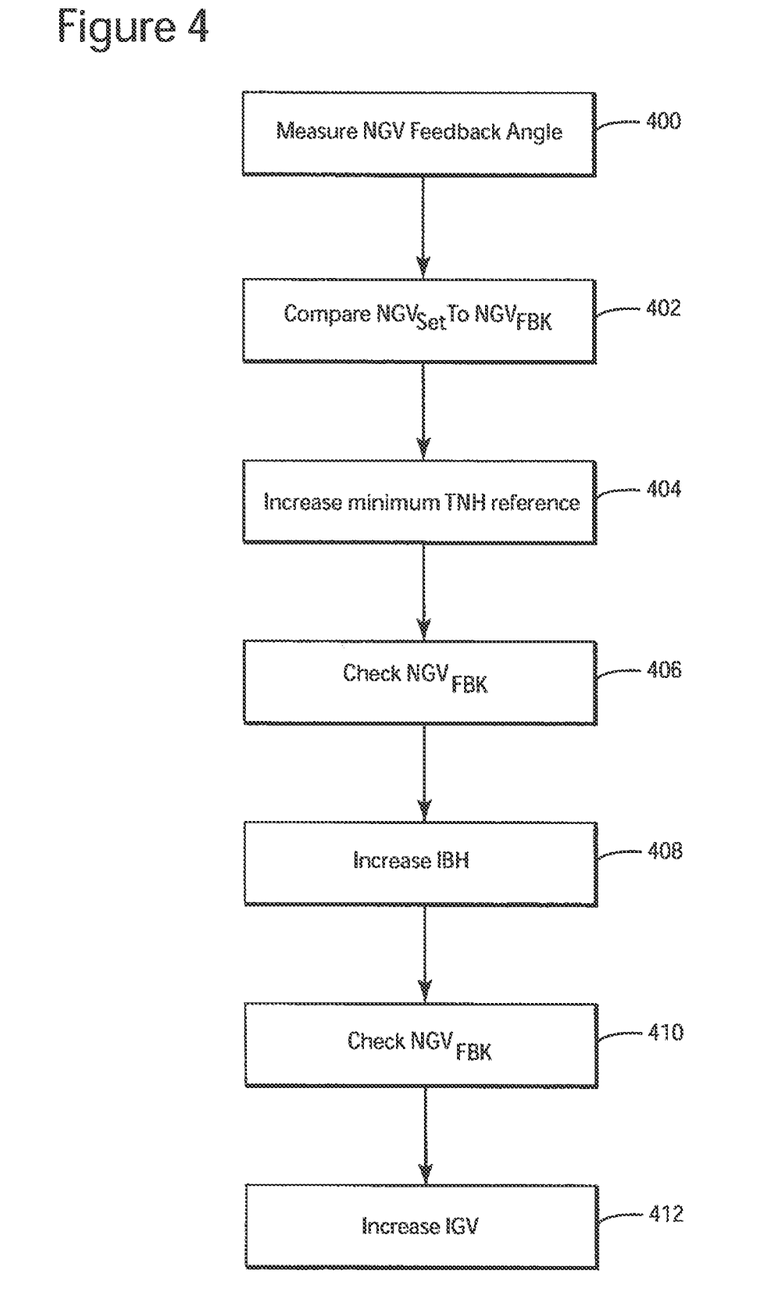
FIG. 4 is flow chart of a method for regaining control of a stuck nozzle mechanism according to an exemplary embodiment.

A method for detecting the improper functioning of the nozzle system (nozzle guide vane (NGV)) and/or remedying this abnormality is discussed now with regard to FIG. 4. According to an exemplary embodiment illustrated in FIG. 4, the NGV failure is detected and corrected. More specifically, in step 400, a value of the NGV angle is measured. The measured value $NGB_{fbk}$ (feedback value) is compared in step 402 with a set value $NGV_{set}$. If a difference between the feedback value and the set value is larger than a certain value for a predetermined time, the NGV system 60 is considered to have been failed, i.e., the nozzles are stuck. In one application, an absolute function ABS is applied to the difference between the feedback and the set values. Thus, in an exemplary embodiment, the condition for a stuck NGV is given by ABS $(NGV_{set}-NGV_{fbk})>2$ for around 60s.

This method may correct the detected failure of the NGV system 60 by taking one or more of the following steps. When the logic 62 of the gas turbine detects that the NGV system has failed, based on the above noted relation, the logic instructs in step 404 the gas turbine to increase the minimum speed TNH reference of the first turbine 31. The logic 62 may be a processor, dedicated circuitry, computer software or a combination thereof. The logic 62 may be a central device that coordinates the entire gas turbine 30 or may be distributed at the compressor, combustor, turbines, etc. The logic 62 may be connected to a memory 64 (see FIG. 2) that stores the above noted predetermined values and necessary computer instructions.

Logic 62 may be connected to one or more sensors 66 (see FIG. 2) for detecting whether the NGV system 60 has failed. The sensor 66 may be configured to measure a rotation angle of the nozzles of the NGV system 60. The logic 62 may be connected to the compressor 44 for controlling the speed of the compressor, an intake of the compressor, etc., may be connected to the combustor 48 for controlling a mixture ratio between the compressed medium from the compressor and the fuel and other characteristics of the combustor, and also may be connected to the turbines 31 and 33 to perform other functions.

The logic 62 may be configured to increase the minimum TNH reference to a higher value, which may vary from machine to machine. According to an exemplary embodiment, the minimum TNH reference is increased from the current value to a higher value in an open loop. For example, if the current minimum TNH reference is 94% of a nominal value, this current value may be increased to 98% of the nominal value. In step 406, the logic 62 verifies whether the NGV system mobility is restored by repeating steps 400 and 402. If the NGV system's mobility has been restored, the method does not advance further. However, if the NGV system is still stuck, the method advances to step 408 in which, the IBH flow is increased from a current value up to a maximum value.

In one application, the maximum value is 7% of the total flow. Step 408 may be performed in an incremental way, i.e., the IBH flow may be increased to a first value, then the $NGV_{fbk}$ is measured and if the NGV system is still stuck, the IBH value is further increased to a second value and so on until the IBH flow is increased to the maximum value. In other words, this is a closed loop cycle.

After step 408 and the value of the IBH flow being at the maximum value, the method advances to step 410 for checking whether the NGV system's mobility has been restored. If this is not the case, i.e., the NGV system is still stuck, the method advances to step 412 in which an IGV angle is increased from a current value to a maximum value. In one application, the maximum value of the IGV angle is 75° degrees. Step 412 may be a closed loop as discussed above with regard to step 408.

The logic 62 is configured to sequentially increase the minimum TNH reference, IBH flow and IGV angle and also to stop this sequence as soon as the NGV's mobility is restored. In one exemplary embodiment, the sequence of TNH, IBH and IGV increase is followed and no other sequence is used.

Figure 5:
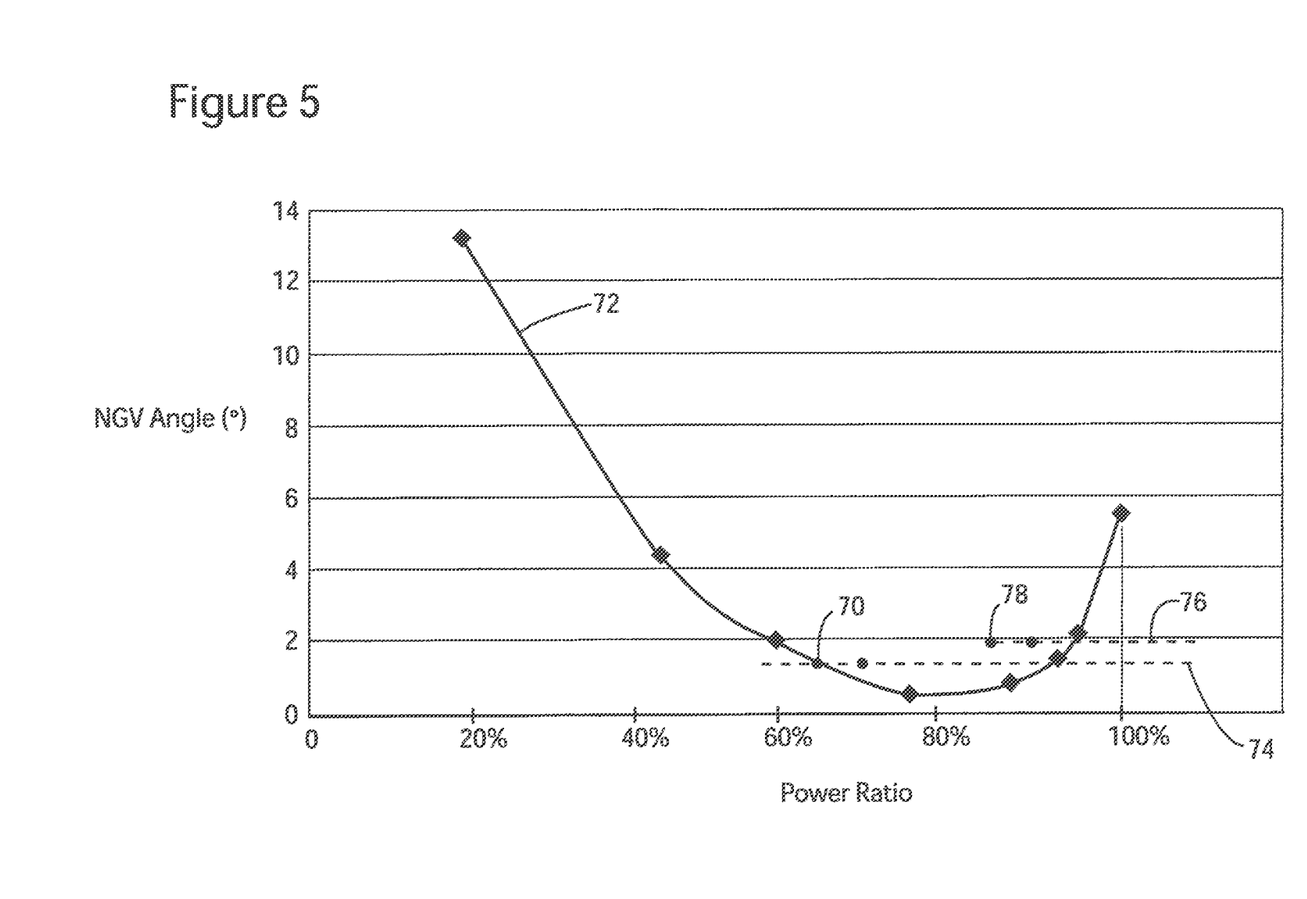
FIG. 5 is a graph showing a nozzle mechanism angle versus power according to an exemplary embodiment.

A dependence of the NGV angle (in degrees) versus a power produced by the gas turbine is shown in FIG. 5. It is noted that as the power output of the gas turbine increases, the NGV angle initially decreases until a minimum is reached, then it increases again. It is noted that the values on the x axis of FIG. 5 are for exemplary and not to limit the exemplary embodiments. Other numbers may be applicable depending on the machine, the load and other factors. As the NGV angle decreases, it reaches a point 70, at the intersection of curve 72 with sticking angle threshold 74. Point 70 characterizes, for a specific gas turbine and operating conditions, the condition for which the NGV system has failed. Thus, as the output power of the gas turbine is further increased, the NGV's angle remains constant on curve 74. When the NGV system is detected to be stuck, the method described with regard to FIG. 4 is activated and the TNH, IBH and IGV sequence is followed. The point indicating the activation of the method of FIG. 4 is shown as point 78 on curve 76 in FIG. 5. At a certain time, when the NGV system's mobility is restored, the representative point of the NGV angle returns on curve 72. The method illustrated in FIG. 4 may be implemented in the controller 62 in software form, circuitry form or a combination thereof. In one application, a software patch may be designed to include computer instructions, which when executed by a processor of the controller 62, executes one or more of the steps shown in FIG. 4. The software patch may be installed in existing gas turbines to correct the sticking nozzles.

According to one or more exemplary embodiments, a system having a controller configured as discussed above advantageously improves a control of a high-pressure shaft speed, and/or reduces power limitations due to the sticking nozzles, and/or shorten the loss of performance of the gas turbine, and/or improves a combustor turndown capability.

Figure 6:
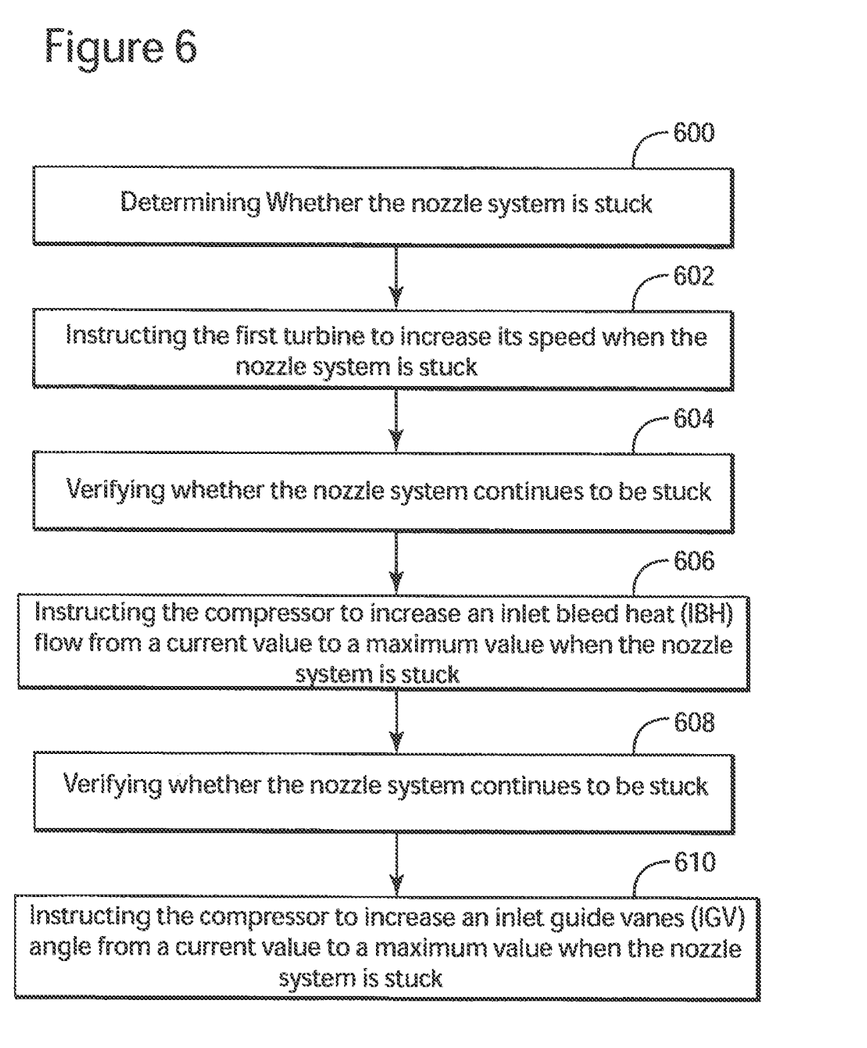
FIG. 6 is a flow chart of a method for regaining control of a stuck nozzle mechanism according to an exemplary embodiment.

According to an exemplary embodiment illustrated in FIG. 6, there is a method for controlling a stuck nozzle system installed between first and second turbines connected in series to a compressor. The method includes a step 600 of determining whether the nozzle system is stuck, a step 602 of instructing the first turbine to increase the minimum speed reference when the nozzle system is stuck, a step 604 of verifying whether the nozzle system continues to be stuck, a step 606 of instructing the compressor to increase an inlet bleed heat (IBH) flow from a current value to a maximum value when the nozzle system is stuck, a step 608 of verifying whether the nozzle system continues to be stuck, and a step 610 of instructing the compressor to increase an inlet guide vanes (IGV) angle from a current value to a maximum value when the nozzle system is stuck.

The disclosed exemplary embodiments provide a system and a method for regaining control of stuck nozzles in a gas turbine or other machine. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Figure 7:
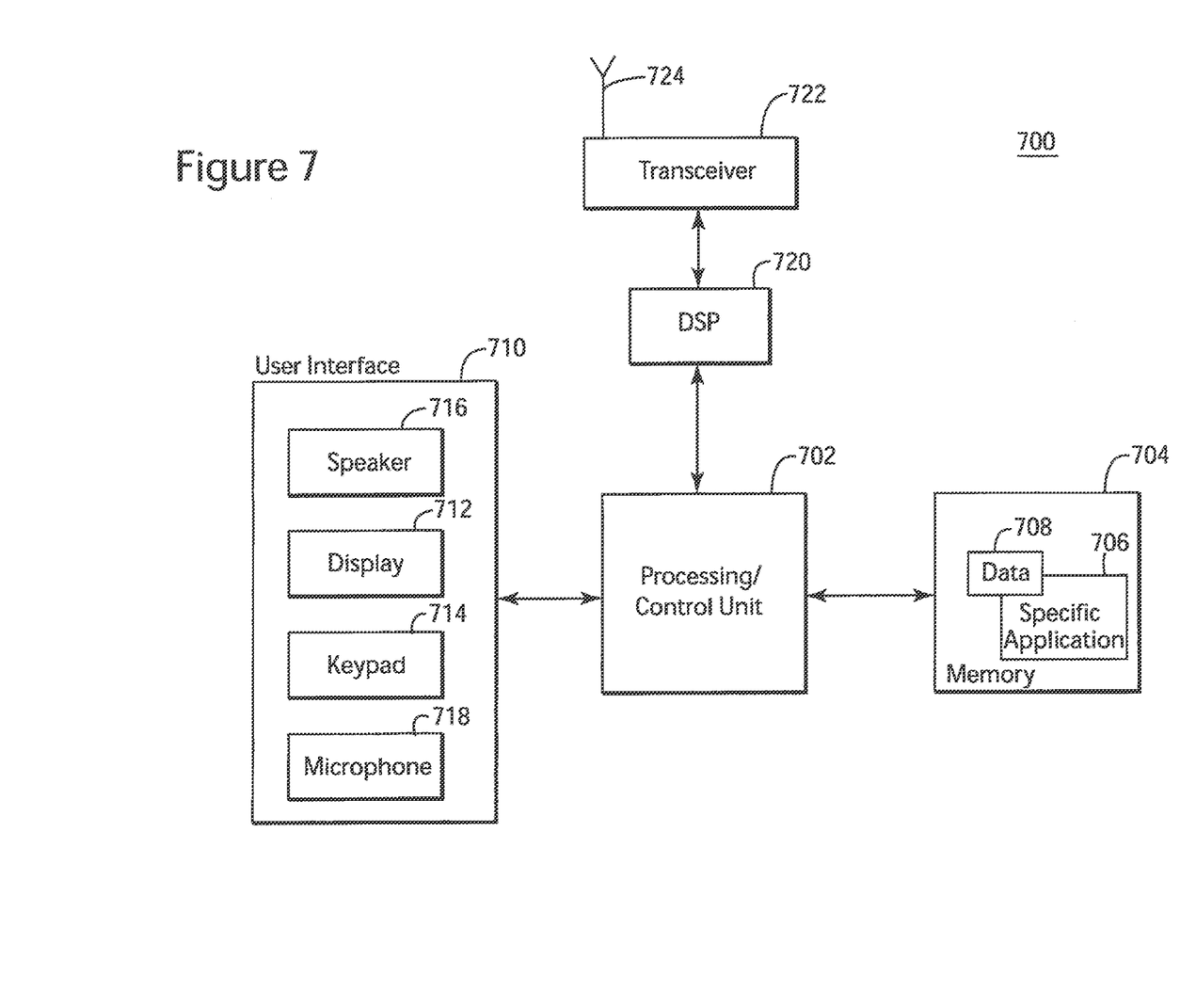
FIG. 7 is a schematic diagram of a controller that controls a gas turbine.

For purposes of illustration and not of limitation, an example of a representative controller (logic mechanism) capable of carrying out operations in accordance with the exemplary embodiments is illustrated in FIG. 7. It should be recognized, however, that the principles of the present exemplary embodiments are equally applicable to other computing systems.

The exemplary controller 700 may include a processing/control unit 702, such as a microprocessor, reduced instruction set computer (RISC), or other central processing module. The processing unit 702 need not be a single device, and may include one or more processors. For example, the processing unit 702 may include a master processor and associated slave processors coupled to communicate with the master processor. Alternatively, the processing unit 702 may have the structure shown in FIG. 2.

The processing unit 702 may control the basic functions of the system as dictated by programs available in the storage/memory 704. Thus, the processing unit 702 may execute the functions described in FIGS. 4 and 6. More particularly, the storage/memory 704 may include an operating system and program modules for carrying out functions and applications on the controller. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the controller 700 via data signals, such as being downloaded electronically via a network, such as the Internet.

One of the programs that may be stored in the storage/memory 704 is a specific program 706. As previously described, the specific program 706 may interact with various sensors or components of the gas turbine to determine whether the nozzle mechanism is stuck. The program 706 and associated features may be implemented in software and/or firmware operable by way of the processor 702. The program storage/memory 704 may also be used to store data 708, or other data associated with the present exemplary embodiments. In one exemplary embodiment, the programs 706 and data 708 are stored in non-volatile electrically-erasable, programmable ROM (EEPROM), flash ROM, etc. so that the information is not lost upon power down of the controller 700.

The processor 702 may also be coupled to user interface 710 elements. The user interface 710 may include, for example, a display 712 such as a liquid crystal display, a keypad 714, speaker 716, and a microphone 718. These and other user interface components are coupled to the processor 702 as is known in the art. The keypad 714 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The controller 700 may also include a digital signal processor (DSP) 720. The DSP 720 may perform a variety of functions, including analog-to-digital (A/D) conversion, digital-to-analog (D/A) conversion, speech coding/decoding, encryption/decryption, error detection and correction, bit stream translation, filtering, etc. The transceiver 722, generally coupled to an antenna 724, may transmit and receive the radio signals associated with a wireless device, e.g., a sensor.

The controller 700 of FIG. 7 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 706 and associated features, and data 708, may be stored in a variety of manners, may be operable in a variety of processing devices, and may be operable in electronic devices having additional, fewer, or different supporting circuitry and user interface mechanisms.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

We claim:

1. A method for controlling a stuck nozzle system installed between first and second turbines connected in series to a compressor, the method comprising:
    determining whether the nozzle system is stuck;
    instructing the first turbine to increase a minimum reference speed when the nozzle system is stuck;
    verifying whether the nozzle system continues to be stuck;
    instructing the compressor to increase an inlet bleed heat (IBH) flow from a current value to a maximum value when the nozzle system is stuck;
    verifying whether the nozzle system continues to be stuck; and
    instructing the compressor to increase an inlet guide vanes (IGV) angle from a current value to a maximum value when the nozzle system is stuck.

2. The method of claim 1, further comprising:
    increasing the minimum speed reference of the first turbine, increasing the IBH flow and increasing the IGV angle in this sequence.

3. The method of claim 2, further comprising:
    stopping the sequence when the nozzle system is not stuck.

4. The method of claim 1, further comprising:
    increasing the minimum speed reference of the first turbine from a current value to a higher value without verifying whether a control of the nozzle system has been regained.

5. The method of claim 4, wherein the minimum speed reference is about 94% of a nominal value and the increased minimum speed reference is about 98% of the nominal value.

6. The method of claim 1, further comprising:
    increasing incrementally the IBH flow from the current value to the maximum value; and
    detecting whether the nozzle system is still stuck between incremental increases of the IGV angle.

7. The method of claim 6, further comprising:
    stopping the incremental increase of the IGV angle when the nozzle system is unstuck.

8. The method of claim 6, wherein the maximum value is 7% of a maximum flow through the compressor.

9. A system configured to remedy stuck nozzles, the system comprising:
    a compressor configured to compress a medium, the compressor including,
        an inlet bleed heat (IBH) mechanism that allows part of the compressed medium back to an inlet of the compressor, and
        an inlet guide vanes (IGV) mechanism configured to control a medium flow into the inlet of the compressor;
    a combustor fluidly connected to the compressor and configured to mix the compressed medium with fuel for generating an exhaust gas after ignition;
    first and second turbines connected in series to the combustor;
    a nozzle mechanism including the nozzles and configured to adjust a split of enthalpy between the first turbine and the second turbine; and
    a controller connected to the first turbine, the IBH mechanism, and the IGV mechanism and configured to increase a minimum speed reference of the first turbine, an IBH flow and an IGV angle to unstuck the nozzle mechanism.

10. A non-transitory computer readable medium including computer executable instructions, wherein the instructions, when executed, implement a method for controlling a stuck nozzle system installed between first and second turbines connected in series to a compressor, the method comprising:
    determining whether the nozzle system is stuck;
    instructing the first turbine to increase a minimum speed reference when the nozzle system is stuck;
    verifying whether the nozzle system continues to be stuck;
    instructing the compressor to increase an inlet bleed heat (IBH) flow from a current value to a maximum value when the nozzle system is stuck;
    verifying whether the nozzle system continues to be stuck; and
    instructing the compressor to increase an inlet guide vanes (IGV) angle from a current value to a maximum value when the nozzle system is stuck.

* * * * *